United States Patent
Nakamura et al.

(10) Patent No.: US 11,720,092 B2
(45) Date of Patent: Aug. 8, 2023

(54) MAINTENANCE MANAGEMENT SYSTEM AND DATA PROCESSING METHOD

(71) Applicant: Nippon Telegraph and Telephone Corporation, Tokyo (JP)

(72) Inventors: Mizuto Nakamura, Tokyo (JP); Osamu Okino, Tokyo (JP); Toshihiko Seki, Tokyo (JP); Hiroyuki Oyanagi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 174 days.

(21) Appl. No.: 17/266,803

(22) PCT Filed: Aug. 1, 2019

(86) PCT No.: PCT/JP2019/030233
§ 371 (c)(1),
(2) Date: Feb. 8, 2021

(87) PCT Pub. No.: WO2020/031846
PCT Pub. Date: Feb. 13, 2020

(65) Prior Publication Data
US 2021/0311467 A1     Oct. 7, 2021

(30) Foreign Application Priority Data

Aug. 10, 2018    (JP) .................................. 2018-151602

(51) Int. Cl.
    *G05B 23/02*            (2006.01)
    *G08C 15/02*            (2006.01)
(52) U.S. Cl.
    CPC ..... *G05B 23/0281* (2013.01); *G05B 23/0232* (2013.01); *G08C 15/02* (2013.01)
(58) Field of Classification Search
CPC . G05B 23/0232; G05B 23/0281; G08C 15/02
See application file for complete search history.

(56) References Cited

U.S. PATENT DOCUMENTS

| | | | | |
|---|---|---|---|---|
| 7,917,625 B1 * | 3/2011 | Cook | ................... | G06F 9/5083 |
| | | | | 370/254 |
| 11,431,169 B1 * | 8/2022 | Buttgenbach | .......... | H02J 3/004 |

(Continued)

FOREIGN PATENT DOCUMENTS

| | | | | |
|---|---|---|---|---|
| CN | 107124445 A | * | 9/2017 | ............. H04L 43/16 |
| CN | 110035055 A | * | 7/2019 | .......... G06F 11/3034 |

(Continued)

OTHER PUBLICATIONS

Alaxala.com, [online], "Flow Aggregate Statistics (NetFlow Version8)," 2011, retrieved on Jun. 26, 2018, retrieved from URL<https://www.alaxala.com/jp/techinfo/archive/manual/AX5400S/HTML/10_10_/APGUIDE2/0164.HTM>, 13 pages (with English Translation).

*Primary Examiner* — Manuel A Rivera Vargas
*Assistant Examiner* — Yaritza H Perez Bermudez
(74) *Attorney, Agent, or Firm* — Fish & Richardson P.C.

(57) ABSTRACT

To prevent a delay in detection of a fault and the like and to cut down a load on a management side while making transmission of data appropriate in consideration of importance and properties of each type of the data in a case in which a large amount of data is transmitted from management target apparatuses. Items with high priority are processed first, and items with a low priority are allowed to be thinned out in accordance with priority and a weight that a management system 10 defines for each data item, thereby reducing a load. The thinning out is performed by limiting the number of data items to be processed once in accordance with a load level. Data acquisition intervals and priority for each item are dynamically changed by reflecting the importance of the data of each item and a change thereof. Trends of data and the like distributed using telemetry are observed and are fed back to load control through control using an AI or a rule base. In a case in which distribution intervals of each data item are changed, the distribution intervals are (Continued)

changed to a multiple of a basic cycle to curb influences on correlations among the items.

11 Claims, 12 Drawing Sheets

(56) References Cited

U.S. PATENT DOCUMENTS

| | | | | |
|---|---|---|---|---|
| 2019/0317833 A1* | 10/2019 | Kashiwagi | ............... | G06F 9/44 |
| 2021/0185123 A1* | 6/2021 | Fujino | ................... | G06F 3/0631 |
| 2021/0258258 A1* | 8/2021 | Takagi | .................... | H04L 47/28 |
| 2022/0021449 A1* | 1/2022 | Kawahara | .............. | H04B 10/27 |

FOREIGN PATENT DOCUMENTS

| | | | | |
|---|---|---|---|---|
| JP | 2011-211555 | 10/2011 | | |
| WO | WO-2013139097 A1 * | 9/2013 | ........ | H04W 28/0247 |

* cited by examiner

PRIORITY HIGH ↑

| No. | ITEMS | WEIGHT |
|-----|--------|--------|
| 1 | MEMORY | 1 |
| 2 | CPU | 1 |
| 3 | Syslog | 1 |
| ... | ... | ... |

| No. | ITEMS | WEIGHT |
|-----|--------|--------|
| 1 | MEMORY | 2 |
| 2 | CPU | 1 |
| 3 | Syslog | 1 |
| ... | ... | ... |

| LEVEL | CPU USAGE RATE | TOTAL NUMBER OF ITEMS THAT CAN BE PROCESSED |
|-------|----------------|---------------------------------------------|
| 1 | ~50% | ALL |
| 2 | 51~70% | 15 |
| 3 | 71~90% | 10 |
| 4 | ~100% | 5 |

MAINTENANCE MANAGEMENT SYSTEM AND DATA PROCESSING METHOD

CROSS-REFERENCE TO RELATED APPLICATIONS

This application is a National Stage application under 35 U.S.C. § 371 of International Application No. PCT/JP2019/030233, having an International Filing Date of Aug. 1, 2019, which claims priority to Japanese Application Serial No. 2018-151602, filed on Aug. 10, 2018. The disclosure of the prior application is considered part of the disclosure of this application, and is incorporated in its entirety into this application.

TECHNICAL FIELD

The present invention relates to a maintenance management system and a data processing method for managing a plurality of management targets that regularly distribute data utilizing telemetry techniques.

BACKGROUND ART

In a network that provides various communication services, for example, services are required to be continuously provided without any pause. Thus, it is necessary to constantly monitor business operation apparatuses such as servers that provide each of the services such that failures, performance degradation, and the like do not occur.

A communication service operator or the like is thus required to recognize situations occurring in the network in real time. In regard to such recognition of situations in real time, telemetry that is a push-type data acquisition technique carried out under initiative of apparatuses on a managed side is receiving attention. Telemetry is a technique for acquiring data of observation targets from a location remote from the observation targets and performing various kinds of observation, and the observation targets can regularly and repeatedly transmit data without any request from the outside.

On the other hand, the communication service providers or the like are assumed to collectively manage multiple business operation apparatuses that are present in the network using a common management system. Data transmitted from each of the business operation apparatuses that are management targets is thus regularly input to the management system, and if the number of business operation apparatuses is large, then the amount of data that the management system receives significantly increases. In a case in which data transmission is repeated by each of the business operation apparatuses at short time cycles, in particular, there is a probability of the amount of data that the management system receives exceeding a processing ability of the management system and the management system becoming overloaded.

According to a fault continuation monitoring system in Patent Literature 1, for example, a technique for dynamically controlling the amount of message flow from agents and performing continuous fault monitoring without affecting other message monitoring operations even at the time of message flash is disclosed. Specifically, Patent Literature 1 discloses that data is accumulated for a specific period on the side of "agents" that are monitoring targets in order to reduce a load of a "fault monitoring manager" corresponding to the aforementioned management system (see FIG. 3 in Patent Literature 1).

On the other hand, the specification of "NryFlow" disclosed in Non Patent Literature 1 enables grouping of data in units of flows depending on conditions such as header information. It is thus possible to cut down the number of flows in the push-type data acquisition system and to reduce a load of the system.

CITATION LIST

Patent Literature

Patent Literature 1: JP 2011-211555 A

Non Patent Literature

Non Patent Literature 1: "Flow aggregation statistics (NetFlow Version 8)", Internet: <URL: https://www.alaxala.com/jp/techinfo/archive/manual/AX5400S/HTML/10_10/_/APGUIDE2/0164.HTM>

SUMMARY OF THE INVENTION

Technical Problem

However, according to the technique in Patent Literature 1, each apparatus that is a monitoring target is required to accumulate data, which leads to a delay in timing at which the data is transmitted, and real time properties of the data that the management system acquires are compromised.

According to the technique in Non Patent Literature 1, although it is possible to reduce the number of flows through the grouping, it is not possible to group data types in the apparatuses in a case in which each of the apparatuses that are management targets transmit a plurality of types of data. In the case of a business operation apparatus such as a server, for example, it is necessary to individually monitor various types of data such as a usage rate of a central processing unit (CPU) and a usage rate of a memory, and it is assumed that importance of each piece of data and the length of a time cycle during which monitoring is to be performed significantly change in accordance with situations.

In the case of an optical transmission apparatus, there is a trend for light output power to gradually decrease due to aging of a laser amplifier that is a semiconductor. It is thus necessary to monitor a light output in order to prevent occurrence of a failure in such an apparatus in advance. However, because a probability of a "fault that cannot be detected," that is, a "silent fault," occurring is significantly low in a situation in which the light output is sufficiently large, importance of such data is low, and no problem occurs even if the time cycle at which data is acquired is extended. However, in a case in which the light output falls below a specific value, there is a high probability of a "silent fault" occurring, the importance becomes high, and it becomes necessary to shorten the time cycle at which data is acquired.

According to the technique in Non Patent Literature 1, it is not possible to group types of a plurality of pieces of data transmitted by the same apparatus, and it is possible to cut down the data flow only for each apparatus. In other words, because flows of a plurality of types of data with different conditions such as importance and time cycles are collectively controlled, it is necessary to thin out important data as well and to extend an acquisition cycle of data that needs to be monitored at a short time cycle as well, in order to cut down a load of the management system.

The present invention was made in view of such circumstances, and an object thereof is to provide a maintenance management system and a data processing method capable of preventing a delay in detection related to a probability or the like of a fault, making transmission of data appropriate in consideration of importance and properties of each type of data, and cutting down a load on the management side in a case in which each of a plurality of apparatuses that are management targets transmits a plurality of types of data.

Means for Solving the Problem (1) There is provided a maintenance management system that manages a plurality of business operation apparatuses, each of which has a function of regularly distributing data using telemetry techniques, the maintenance management system including: a data processing unit configured to acquire and process each piece of data that the plurality of business operation apparatuses regularly distribute; and a load level management unit configured to cut down the amount of data processing to reduce a load required by the data processing unit to process the data in accordance with a level of the load,
wherein the load level management unit executes, in a case in which a plurality of items are included in the data distributed by each of the plurality of business operation apparatuses, at least one of processing for adjusting the number of data items to be processed by the data processing unit and processing for adjusting time intervals at which each data item is processed.

According to the maintenance management system, it is possible to change the amount of data processing per unit time that affects a load of the data processing unit for each data item by the load level management unit executing the processing. It is thus possible to cut down the load and to avoid overloading when the level of the load required by the data processing unit to process the data is high. Additionally, because adjustment can be made for each data item, it is possible to cut down the load in a state that is made appropriate in accordance with properties such as importance and a time cycle of each data item.

(2) In the maintenance management system according to (1) described above, the load level management unit defines a priority of each data item, and the data processing unit processes each data item in order from the highest priority and ends the processing at a timing at which the number of processed data items reaches an upper limit.

According to the maintenance management system, it is possible to reliably process each of data items to which a high priority is allocated and to reduce a load of the data processing unit by thinning out, that is, omitting the processing of each of the data items with a low priority, even in a case in which the load of the data processing unit increases.

(3) In the maintenance management system according to (1) or (2) described above, the load level management unit dynamically adjusts, in accordance with a variation in necessity related to each data item, the priority of a corresponding data item or time intervals at which each data item is processed.

According to the maintenance management system, it is possible to optimize data items that are actually processed, by dynamically reflecting a variation in necessity of each of the data items in the priorities and the time intervals. In regard to a specific data item in which an abnormal value beyond a normal range has appeared, for example, there is a high probability of a failure having occurred or a probability of this causing a failure, and it is thus desirable to monitor the data item at a high frequency even if the data item typically has a low priority. It is possible to dynamically reflect such a variation in necessity in the priority or the time interval.

(4) In the maintenance management system according to (3) described above, the load level management unit raises at least a priority of a data item in which an abnormal value has occurred or reduces time intervals for processing the data item in which the abnormal value has occurred.

According to the maintenance management system, it is possible to process a data item with priority even if the data item typically has a low priority, by raising the priority of the data item in which the abnormal value has occurred. It is also possible to repeatedly process a data item at a short cycle even if the data item is typically processed at large time intervals, by reducing the time intervals for processing the data item in which the abnormal value has occurred.

(5) In the maintenance management system according to (1) described above, the load level management unit provides feedback to make data items that are processing targets of the data processing unit appropriate, based on a trend of data in each data item.

According to the maintenance management system, it is possible to feed back a result of observing the trend of the data in each data item to an attribute such as a priority of each data item. It is thus possible to make the data items that are processing targets of the data processing unit appropriate. For example, lowering a priority or changing a time cycle of the processing to a long state is assumed for a data item for which a numerical value has not substantially changed over a specific time. It is thus possible to cut down a load required by the data processing unit to process the data without significantly affecting a result of a management state.

(6) In the maintenance management system according to (5) described above, the load level management unit excludes, from the processing targets, data items with low correlations to a predetermined data item that is highly related to a failure in the business operation apparatus and/or data items that do not change for a specific period.

According to the maintenance management system, it is possible to cut down a load required by the data processing unit to process the data without significantly affecting a result of a management state, by excluding, from the processing targets, the data items with low correlations to the data item that is highly related to the failure in the business operation apparatuses and the data items that do not change for the specific period.

(7) In the maintenance management system according to (5) described above, the load level management unit thins out processing of the data items by doubling time intervals for processing data items with low correlations to a predetermined data item that is highly related to a failure in the business operation apparatus and/or data items that do not change for a specific period.

According to the maintenance management system, it is possible to increase the acquisition cycle of the data items with a low priority and to efficiently cut down the load because each data item is processed at a different acquisition cycle through the thinning out. Because the acquisition cycles of the predetermined data items are allocated at multiples of prescribed cycles, it is possible to curb influences on evaluation of correlations among the plurality of data items through the thinning out.

(8) There is provided a data processing method for controlling a maintenance management system that manages a plurality of business operation apparatuses, each of which has a function of regularly distributing data using telemetry techniques, the data processing method including: acquiring and processing each piece of data that the plurality of business operation apparatuses regularly distribute; monitoring a level of a load required by the maintenance management system to process the data; in a case in which a plurality of items are included in each piece of the data that the plurality of business operation apparatuses distribute, executing at least one of processing for adjusting the number of data items to be processed and processing for adjusting time intervals at which each data item is processed; and cutting down the amount of data processing in accordance with the level of the load.

According to the data processing method, it is possible to change the amount of data processing per unit time that becomes a load of the data processing for each data item, by executing the aforementioned processing. It is thus possible to cut down the load and to avoid overloading when the level of the load required to process the data is high. Additionally, because adjustment can be made for each data item, it is possible to cut down the load in a state that is made appropriate in accordance with properties such as importance and a time cycle of each data item.

Effects of the Invention

According to the maintenance management system and the data processing method of the present invention, it is not necessary to accumulate data before transmission on the side of the management targets, and it is thus possible to prevent a delay of detection related to a probability or the like of a fault. It is also possible to make transmission of data appropriate in consideration of importance and properties of each type of data, to reduce a load on the management side, and to prevent overloading, in a case in which each of the plurality of apparatuses that are management targets transmits a plurality of types of data.

BRIEF DESCRIPTION OF DRAWINGS

FIG. 4 is a schematic view illustrating a configuration example of an acquisition setting file Cf2.

FIG. 5 is a schematic view illustrating a configuration example of the acquisition setting file Cf2.

FIG. 6 is a schematic view illustrating a configuration example of a load level management table.

DESCRIPTION OF EMBODIMENTS

Embodiments of the present invention will be described below with reference to the respective drawings.

Figure 1:
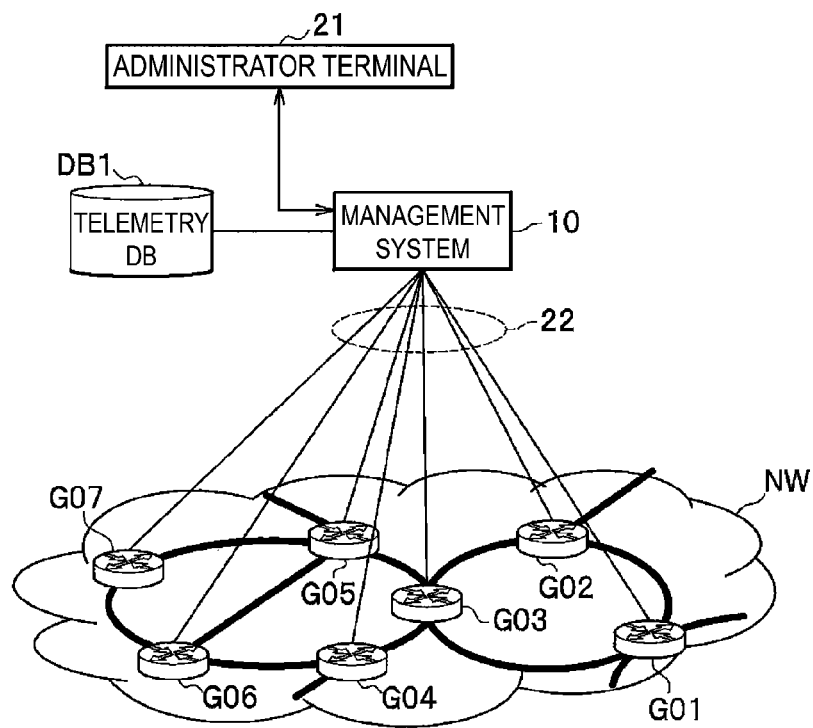
FIG. 1 is a block diagram illustrating an example of a connection state between a plurality of management targets and a management system according to an embodiment of the present invention.

Example of connection state between a plurality of management targets and management system An example of a connection state between a plurality of management targets and a management system according to an embodiment of the present invention is illustrated in FIG. 1.

In the example illustrated in FIG. 1, a plurality of business operation apparatuses G01 to G07 are connected to a communication network NW. Each of the business operation apparatuses G01 to G07 is a server or a transmission apparatus used to provide various communication services, for example, and is required to continue the services for twenty four hours with no pause. Each of the business operation apparatuses G01 to G07 is a management target of a management system 10.

The management system 10 corresponds to the maintenance management system according to the present invention. The management system 10 carries out the data processing method according to the present invention. The management system 10 is an apparatus included in an operation system (OpS) that supports maintenance and operation on an apparatus level of network apparatuses and a service control layer server group that configure a next-generation carrier network and on a network level, and the management system 10 has a function of recognizing a situation occurring in the communication network NW in real time. In other words, the management system 10 is used to detect an operating condition of each of the business operation apparatuses G01 to G07 and a probability of occurrence of a problem such as a failure.

The management system 10 is thus required to collect data representing each state from each of the business operation apparatuses G01 to G07. In the embodiment, each of the business operation apparatuses G01 to G07 includes a telemetry data distribution function mounted thereon. In other words, each of the business operation apparatuses G01 to G07 can distribute data at a time cycle determined in advance. The management system 10 can receive and acquire data that each of the business operation apparatuses G01 to G07 distributes via a telemetry communication path 22. The management system 10 can set a data distribution frequency at each of the business operation apparatuses G01 to G07.

In other words, the business operation apparatuses G01 to G07 use telemetry techniques, and the business operation apparatuses G01 to G07 thus carry out push-type data distribution under initiative of each of the business operation apparatuses G01 to G07. In the case of telemetry, the business operation apparatuses G01 to G07 are not required to interpret a request from the management system 10 and respond to it, and communication loads of the business operation apparatuses G01 to G07 are thus small. The business operation apparatuses G01 to G07 can thus distribute data with high real-time properties.

The management system 10 registers, in a telemetry database DB1, results obtained by acquiring data that each of the business operation apparatuses G01 to G07 distributes and processing the data. Each apparatus that can access the telemetry database DB1 can thus recognize the state of the communication network NW including each of the business operation apparatuses G01 to G07 in real time based on the data registered in the telemetry database DB1.

An administrator or the like who manages the communication network NW can use the administrator terminal 21 to be connected to the management system 10. For example, the administrator can provide an instruction to the management system 10 through an input operation from the administrator terminal 21 to determine an initial state regarding a data distribution frequency of each of the business operation apparatuses G01 to G07 and change settings as needed.

On the other hand, each of the business operation apparatuses G01 to G07 cyclically distributes various kinds of data. Also, there is also a probability of the number of business operation apparatuses G01 to G07 connected to the communication network NW increasing. If data distribution cycles of the business operation apparatuses G01 to G07 are shortened in order to improve real time properties of the data that the management system 10 acquires, then the amount of data that the management system 10 receives significantly increases, and a load increasing state and an available capacity decreasing state are achieved.

In other words, the amount of acquired data DT per one time that the management system 10 receives is calculated by the following equation.

$$DT = Ng \times Np \times Ni \times Ns$$

where Ng: the apparatus number of business operation apparatuses to be managed,
Np: the number of ports used for communication
Ni: the number of monitored items
Ns: data size [bit]

In other words, if the data distribution cycles are shortened, a limit of a data processing ability is approached, or the limit is exceeded, in the management system 10. A case in which the management system 10 cannot process all of received data corresponds to the load increasing state. If the management system 10 receives a large amount of data, then the large amount of data is also registered in the telemetry database DB1. As a result, an available capacity of the telemetry database DB1 begins to decrease. As will be described later, the management system 10 according to the embodiment has a special function for preventing these load increasing state and available capacity decreasing state.

Examples of Telemetry Transmission Data and Telemetry Reception Data

Figure 2:
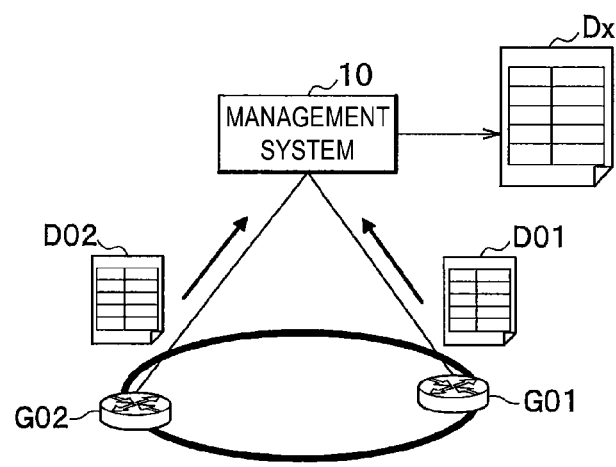
FIG. 2 is a schematic view illustrating an example of telemetry transmission data of management targets and telemetry reception data of the management system.

Examples of telemetry transmission data of the management targets and telemetry reception data of the management system are illustrated in FIG. 2.

As illustrated in FIG. 2, telemetry transmission data D01 that the business operation apparatus G01 distributes includes data of various items of different types. Similarly, telemetry transmission data D02 that the business operation apparatus G02 distributes also includes data of various items of different types. Additionally, telemetry reception data Dx that the management system 10 receives from the business operation apparatuses G01 to G07 also includes data of various items of different types.

Here, in a case in which a state in which the load of the management system 10 has increased and the management system 10 cannot process all data is being approached, the management system 10 is required to cut down the amount of data processing. A typical data cut-down method includes, at the management system 10, selectively cutting down data for each of of business operation apparatuses G01 to G07 or cutting down data of arbitrary items that cannot be fully processed, from among the telemetry reception data Dx.

However, items of the telemetry reception data Dx include data items that are required to be monitored at short cycles and data items that do not cause any problem even if the monitoring cycles are extended. Moreover, which data items are to be monitored at short cycles dynamically changes in accordance with situations. Thus, in the case of the typical data cut-down method, data of important items to be monitored at short cycles is also deleted. This leads to degradation of performance when the operation system (OpS) detects a failure or the like. The management system 10 according to the embodiment can reduce the amount of data processing in consideration of a priority and the like of data of each item and to adjust the load of the management system 10 as will be described later.

Configuration of Management System

Figure 3:
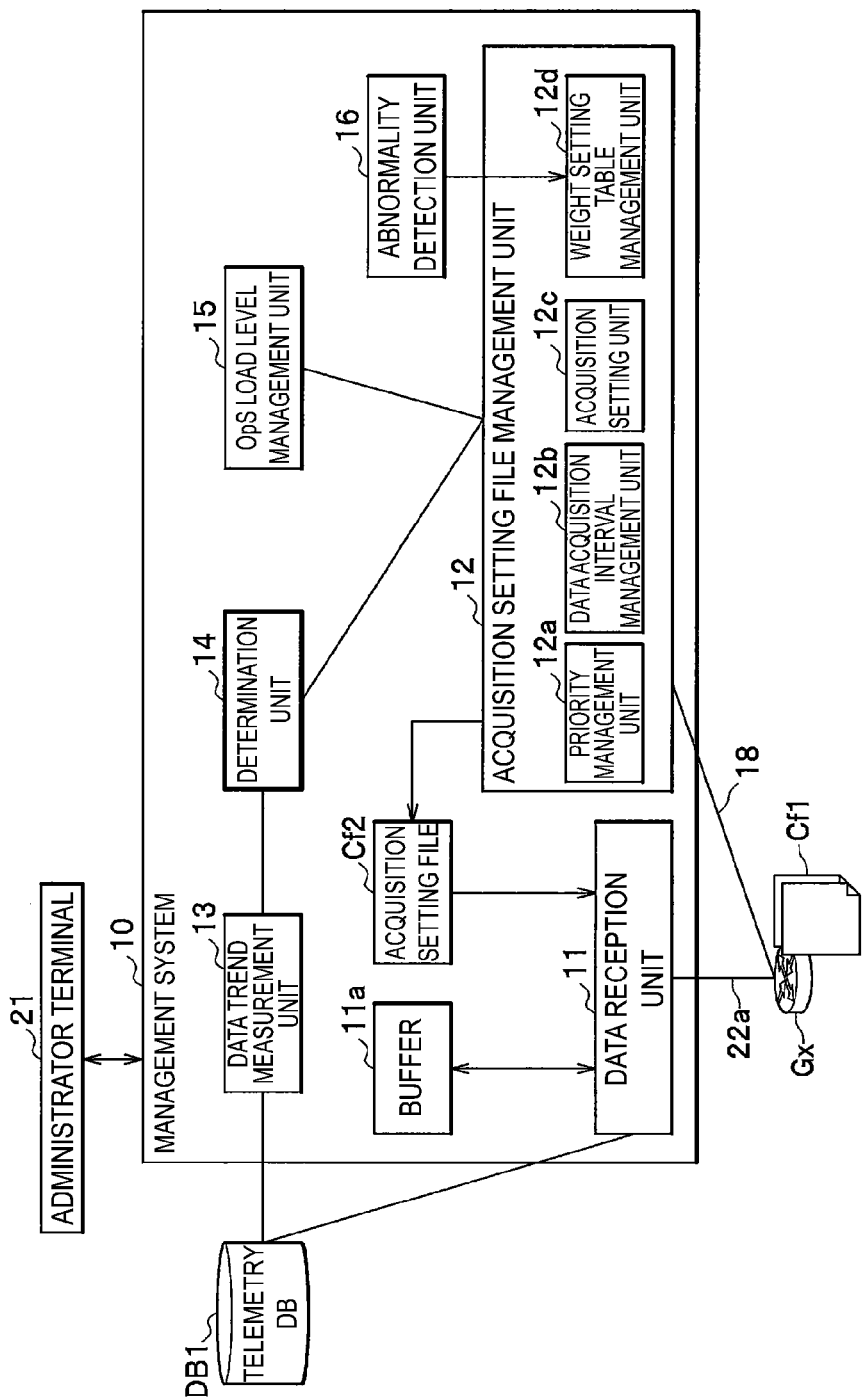
FIG. 3 is a block diagram illustrating a configuration example in terms of functions of the management system.

A configuration example in terms of functions of the management system 10 is illustrated in FIG. 3. Note that a business operation apparatus Gx illustrated in FIG. 3 corresponds to each of the business operation apparatuses G01 to G07 in FIG. 1. In other words, a plurality of business operation apparatuses Gx are connected to the management system 10 in practice.

As illustrated in FIG. 3, the management system 10 includes a data reception unit 11, an acquisition setting file management unit 12, a data trend measurement unit 13, a determination unit 14, an OpS load level management unit 15, and an abnormality detection unit 16. The acquisition setting file management unit 12 includes a priority management unit 12a, a data acquisition interval management unit 12b, an acquisition setting unit 12c, and a weight setting table management unit 12d.

Note that the entity of the management system 10 is configured of computer hardware, basic software (operating system), and dedicated application software similarly to a typical server or the like. It is a matter of course that the management system 10 can also be configured as a virtualized system. Each of components that configure the management system 10 may be disposed on the same server or may be disposed on mutually different independent servers.

The data reception unit 11 receives data that each business operation apparatus Gx distributes via the telemetry communication path 22a. The data reception unit 11 performs predefined data processing on the aforementioned received data and registers data obtained as a result of the processing in the telemetry database DB1. Unprocessed data in data that the data reception unit 11 has received from the business operation apparatus Gx is temporarily held at a buffer 11a.

On the other hand, distribution conditions such as a distribution frequency of data that the business operation apparatus Gx distributes through the telemetry communication path 22a, that is, the length of the time cycle at which distribution is repeated are defined by data held in an acquisition setting file Cf1 that the business operation apparatus Gx can read.

Conditions under which data processing is performed on details that the data reception unit 11 in the management system 10 has received are defined by data held in an acquisition setting file Cf2 that the data reception unit 11 can read.

The acquisition setting file management unit 12 manages details in the acquisition setting files Cf1 and Cf2. The priority management unit 12a in the acquisition setting file management unit 12 manages priority of data items when the data reception unit 11 performs data processing, among the details in the acquisition setting file Cf2.

The data acquisition interval management unit 12b manages data for defining intervals at which the business operation apparatus Gx distributes data, that is, a time cycle at which distribution is repeated, for each data item among the details in the acquisition setting file Cf1.

The acquisition setting unit 12c performs processing for defining initial values of details in each of the acquisition setting files Cf1 and Cf2 and for updating details in each of the acquisition setting files Cf1 and Cf2 as needed, in accordance with an input from the administrator who operates the administrator terminal 21. In a case in which the acquisition setting unit 12c changes the acquisition setting file Cf1, the management system 10 provides an instruction to the business operation apparatus Gx via a control communication path 18.

The weight setting table management unit 12d manages a table prepared for individually adjusting a weight of each data item when the data reception unit 11 processes data, among details in the acquisition setting file Cf2.

The data trend measurement unit 13 performs measurement for observing, for each data item, trends in absolute values and chronological changes in data that the data reception unit 11 has received from the business operation apparatus Gx or data registered in the telemetry database DB1.

The determination unit 14 performs determination for feeding back the trend of each data item that the data trend measurement unit 13 has measured to control of the acquisition setting file management unit 12 and making control of the management system 10 appropriate. In a specific example, the determination unit 14 performs the determination using an artificial intelligence (AI) or a rule base. For example, the determination unit 14 comprehensively determines correlations between a plurality of data items and correlations between specific data items and some failures by applying various rules that have become obvious from past data trends, rules newly discovered in real-time data observation, and the like.

The OpS load level management unit 15 manages a load level of data processing performed by the data reception unit 11 of the management system 10. The OpS load level management unit 15 manages the level of the load required to process data based on latest values such as a CPU usage rate in the data reception unit 11, a memory usage rate, and a usage rate of a storage device that holds the telemetry database DB1 and a trend of changes, for example. In a case in which the level of the load has increased, the OpS load level management unit 15 provides an instruction for making the load appropriate to the acquisition setting file management unit 12 before it becomes impossible to process all of the data.

The abnormality detection unit 16 detects whether or not each piece of data for each item that the data reception unit 11 has received from each business operation apparatus Gx or each piece of data generated on the side of the business operation apparatus Gx is an abnormal value. In other words, in a case in which data of an abnormal value that is different from a usual value has appeared, the abnormality detection unit 16 detects the abnormality and provides an instruction to the weight setting table management unit 12d. The weight setting table management unit 12d follows the instruction and changes a weight application of each data item of data that the data reception unit 11 processes.

In a case in which the business operation apparatus Gx is an optical transmission apparatus, a value of a data item representing a light output of a laser amplifier in the business operation apparatus Gx is also distributed by the business operation apparatus Gx. There is a trend for such a light output value to gradually decrease with degradation of a semiconductor. On the other hand, a variation cycle of this value is significantly long. In other words, the variation in the light output value is significantly small in an ordinary state. Thus, the light output value is ordinarily not required to be monitored at a high frequency, and importance of monitoring is also relatively low. Thus, it is ordinarily possible to thin out data of an item corresponding to the light output value.

However, there is a trend for a steep change that is different from an ordinary change to appear in the light output value if the semiconductor is degraded, and a state in which there is a high probability of a failure occurring is achieved. When such a steep change occurs, the abnormality detection unit 16 detects the change and outputs an alert. The weight setting table management unit 12d increases the weight of the corresponding data item in order to reflect the fact that importance of the corresponding data item has increased in response to the alert of the abnormality detection unit 16. The result is reflected in details of at least one of the acquisition setting files Cf1 and Cf2.

Configuration Example of Acquisition Setting File Cf2

A configuration example of the acquisition setting file Cf2 is illustrated in FIGS. 4 and 5. The acquisition setting file Cf2 illustrated in FIGS. 4 and 5 includes a priority section Cf2a, an item section Cf2b, and a weight section Cf2c. In the example in FIGS. 4 and 5, a case in which data that each business operation apparatus Gx distributes includes each of data items such as a "memory usage rate (memory)", a "CPU usage rate (CPU)", a "system log (Syslog)", . . . .

Each number in the priority section Cf2a means that priority of data processing is high in order of "1", "2", "3", . . . . The item section Cf2b represents an alignment order of data items associated with the priority. In other words, the example in FIG. 4 means that the item of the "memory usage rate" with priority "1" is to be processed with the highest priority, the item of the "CPU usage rate" with priority "2" is to be processed in the second order of priority, and the item of the "system log" with priority "3" is to be processed in the third order of priority.

If the abnormality detection unit 16 detects an abnormal value related to the item of the "CPU usage rate" when details in the acquisition setting file Cf2 are in the state in FIG. 4, then the abnormality detection unit 16 generates an alert therefor. The weight setting table management unit 12d then changes the weight of the item of the "CPU usage rate" in the acquisition setting file Cf2 in FIG. 4 from "1" to "2".

In this case, the priority management unit 12a changes the priority of the items so as to reflect the change in weights of the items of the "CPU usage rate". As a result, details in the acquisition setting file Cf2 are changed as illustrated in FIG. 5. In other words, although the priority of the items of the "CPU usage rate" is lower than those of the items in the "memory usage rate" in the example in FIG. 4 while the priority of the items of the "CPU usage rate" has been changed to the highest and alignment of the items has been changed by reflecting the fact that the weight of the "CPU usage rate" is higher than "1" corresponding to the ordinary weight in the example in FIG. 5.

Configuration Example of Load Level Management Table

A configuration example of a load level management table 15a that the OpS load level management unit 15 manages is illustrated in FIG. 6.

The load level management table 15a illustrated in FIG. 6 holds data representing relationships of a "load level (level)", a "CPU usage rate", and a "total number of items that can be processed". The "CPU usage rate" in the load level management table 15a represents a usage rate of the CPU prepared for the data reception unit 11 illustrated in FIG. 3 to process data.

In the example illustrated in FIG. 6, four types of "load levels" "1" to "4" are present. The "load level" "1" corresponds to the "CPU usage rate" of "0 to 50%", and details of the total number of items that can be processed are "ALL", which means that there is no limit in the number of items.

The "load level" "2" corresponds to the "CPU usage rate" of "51 to 70%", and the upper limit number is limited to "15" by the details of the total number of items that can be processed. The "load level" "3" corresponds to the "CPU usage rate" of "71 to 90%", and the upper limit number is limited to "10" by the details of the total number of items that can be processed. The "load level" "4" corresponds to the "CPU usage rate" of "91 to 100%", and the upper limit number is limited to "5" by the details of the total number of items that can be processed. Note that numerical values after the decimal point of the "CPU usage rate" are rounded down or rounded up.

Although the case in which the "CPU usage rate" is employed as an index representing that the load of the management system 10 is high is assumed in the example illustrated in FIG. 6, another indicator may be employed. For example, the aforementioned index can be selected from among various key performance indicators (KPIs) such as any one of a memory usage rate, a paging usage rate, a disk I/O usage rate, and a swapping usage rate. The KPIs mean numerical values that can be measured based on targets that are desired to be implemented. Additionally, a plurality of indexes may be used in combination.

Overview of Data Processing

Figure 7:
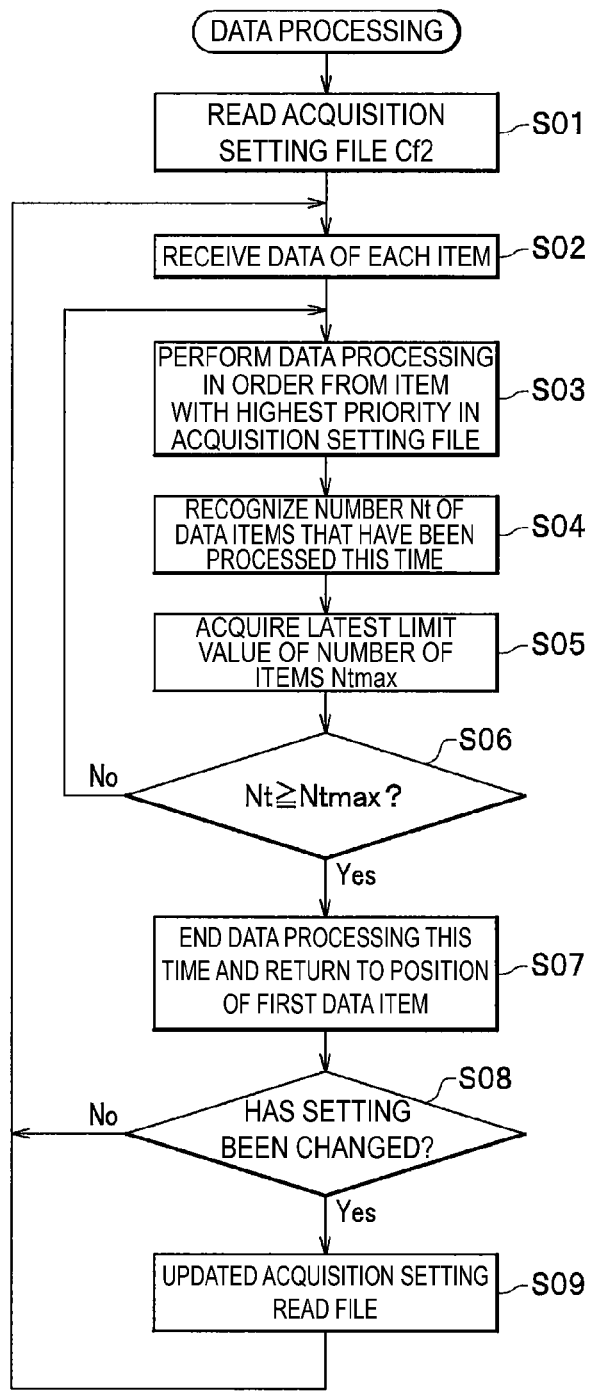
FIG. 7 is a flowchart illustrating an overview of data processing in a data reception unit of the management system.

An overview of data processing in the data reception unit 11 of the management system 10 is illustrated in FIG. 7.

In other words, the CPU allocated to execute the data processing in the data reception unit 11 executes the processing in FIG. 7.

Note that although the case in which only reception data distributed from one business operation apparatus Gx is processed is illustrated in the example in FIG. 7, the management system 10 receives data that each of the plurality of business operation apparatuses G01 to G07 distributes as illustrated in FIG. 1 substantially at the same time and processes the data in practice. The processing in FIG. 7 will be described below.

The data reception unit 11 reads the acquisition setting file Cf2 in Step S01 first and recognizes details of the setting. The data reception unit 11 recognizes acquisition conditions for each item related to the targets of the data processing, such as a plurality of data items that are processing targets, and priority and a weight allocated to each of the data items, as in the acquisition setting file Cf2 illustrated in FIGS. 4 and 5, for example.

The data reception unit 11 receives, for each item, data that each business operation apparatus Gx distributes via the telemetry communication path 22 in Step S02. Details of each item that the data reception unit 11 receives are temporarily held in the buffer 11a until the data reception unit 11 performs data processing.

The data reception unit 11 selects items of reception data in order from the highest priority in the acquisition setting file Cf2 and sequentially executes data processing on the data of each item in Step S03. The data after the processing is registered in the telemetry database DB1.

In a case in which the acquisition setting file Cf2 with the details illustrated in FIG. 4 is read, for example, the data reception unit 11 performs data processing of each of the items of the "memory usage rate", the "CPU usage rate", the "system log", . . . by following the order of priority.

The data reception unit 11 recognizes the number of data items Nt that have been processed this time in the data of the business operation apparatus Gx sent from the same transmission source in Step S04. Because the data item with priority "1", the data item with priority "2", and the data item with priority "3" are processed by following the order of priority in the priority section Cf2a, the number of data items Nt that have been processed this time is the same as the priority of the data item processed at last.

The data reception unit 11 acquires the latest limit value for the number of items Nt max in Step S05. The limit value for the number of items Nt max corresponds to the value of the "total number of items that can be processed" in the load level management table 15a illustrated in FIG. 6, and mutually different values are employed for the load levels 1 to 4. For example, the limit value for the number of items Nt max is "no limit" when the latest load level of the data reception unit 11 is "1", and the limit value for the number of items Nt max is "15" when the load level is "2". Similarly, the limit value for the number of items Nt max is "10" in a case in which the load level is "3", and the limit value for the number of items Nt max is "5" in a case in which the load level is "4".

The data reception unit 11 compares the number of data items Nt with the limit value for the number of items Nt max in next Step S06, and if the number of data items Nt is equal to or greater than the limit value for the number of items Nt max, then the processing proceeds to Step S07. In a case in which the number of data items Nt is less than the limit value for the number of items Nt max, the data reception unit 11 returns to Step S03 and repeats the processing similar to the aforementioned processing.

The data reception unit 11 ends the data processing this time on the reception data of the business operation apparatus Gx sent from the same transmission source and returns to the position of the first data item in Step S07. Thus, remaining unprocessed data items with priority of equal to or greater than the limit value for the number of items Nt max are not the targets of the data processing this time, are regarded as being unnecessary, and are thus discarded from the buffer 11a.

In other words, the number of items on which the data reception unit 11 performs data processing per once in Steps S03 to S06 is limited to the limit value for the number of items Nt max. As a result, the load of the data reception unit 11 is reduced by the amount corresponding to the unprocessed data items. Moreover, the data reception unit 11 processes each item in order of the highest priority, and it is thus possible to avoid dropping of data with relatively high priority.

The data reception unit 11 identifies whether or not setting has been changed in Step S08, and in a case in which the setting has been changed, the data reception unit 11 moves on to next Step S09 to read the updated acquisition setting file Cf2. In a case in which the administrator has provided an instruction for updating the acquisition setting file Cf2 from the administrator terminal 21, or in a case in which the acquisition setting file Cf2 has been updated through feedback control of the determination unit 14, for example, details in the acquisition setting file Cf2 after the update is reflected in the processing of the data reception unit 11 in Step S09.

Note that because it is desirable to monitor item data which shows an abnormal value as frequently as possible regardless of the magnitude of the load, the weight is applied based on a trend of a variation thereof, and priority of processing is dynamically varied in accordance with situations. In regard to the application of the weight, control may be performed such that a result of observing a trend of corresponding data is fed back.

Note that for dropping data items thinned out through the data processing illustrated in FIG. 7 or the like, an estimated value is calculated using a fitted curve, and complementation of the data is performed, based on a trend of chronological changes related to the same data item.

Processing for Controlling Load of Management System

Figure 8:
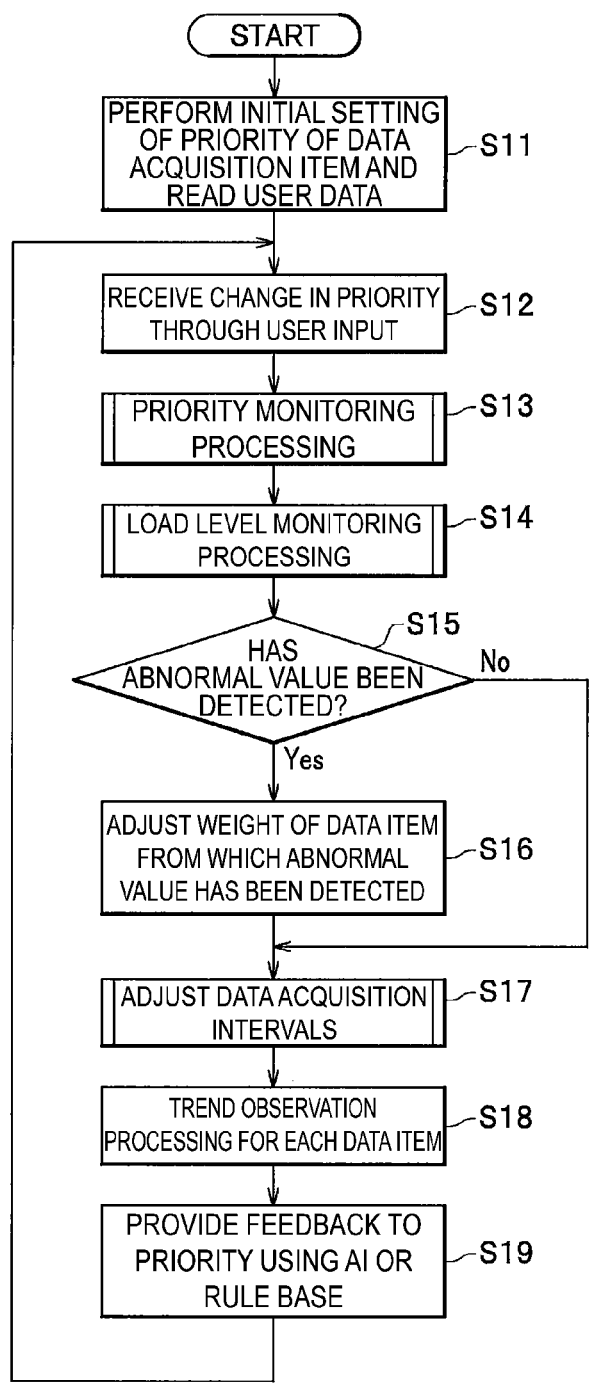
FIG. 8 is a flowchart illustrating an overview of processing for controlling a load of the management system.

An overview of processing for controlling a load of the management system 10 is illustrated in FIG. 8. Note that the order and timing at which each part of the processing illustrated in FIG. 8 is executed can be changed as needed.

The acquisition setting unit 12c of the management system 10 follows an input operation performed by a user, that is, the administrator on the administrator terminal 21, and in Step S11, defines a priority and the like defined in advance for each data acquisition item as an initial values, and further receives a user input. The initial values determined here or the input values are reflected in the details in each of the acquisition setting files Cf1 and Cf2 by the acquisition setting unit 12c.

In a case in which there has been a user input input from the administrator terminal 21 as needed after the management system 10 starts operations, the acquisition setting unit 12c receives the input and changes priority and the like for each item in Step S12.

In Step S13, the priority management unit 12a executes "priority monitoring processing" and dynamically changes allocation of priority to each data item. Details of the processing will be described later.

In Step S14, the OpS load level management unit 15 executes "load level monitoring processing" and recognizes a load level related to the data processing of the data reception unit 11 and a dynamic variation thereof. Details of the processing will be described later.

In Step S15, the weight setting table management unit 12d identifies whether or not the abnormality detection unit 16 has output an alert in response to detection of an abnormal value. In a case in which an abnormal value has been detected, the weight setting table management unit 12d executes next Step S16.

In Step S16, the weight setting table management unit 12d automatically adjusts the weight of the data item from which the abnormality detection unit 16 has detected the abnormal value. In a case in which the "CPU usage rate" has changed to an abnormal value when details in the acquisition setting file Cf2 are in the state illustrated in FIG. 4, the weight setting table management unit 12d changes the weight for the item of the "CPU usage rate" from "1" to "2". In this manner, priority of the "CPU usage rate" increases as illustrated in FIG. 5. Note that although not illustrated in FIG. 8, when data value of the item, from which an abnormal value has been detected, has returned to a normal range, the weight setting table management unit 12d returns the weight of the corresponding item to the normal value "1".

In Step S17, the data acquisition interval management unit 12b executes "data acquisition interval adjustment" processing and updates details in the acquisition setting file Cf1. Details of the processing will be described later.

In Step S18, the data trend measurement unit 13 measures a trend of a change in each data item for data that the data reception unit 11 has received or data registered in the telemetry database DB1.

In Step S19, the determination unit 14 analyzes the measurement result of the data trend measurement unit 13 using an artificial intelligence or a rule base and performs determination in regard to correlations between a plurality of data items, correlations between each data item and a failure in each business operation apparatus Gx, and the like. The result of the determination is fed back to the acquisition setting file management unit 12. Through the feedback, the acquisition setting file management unit 12 dynamically adjusts a priority of data of each item, data acquisition intervals for each item, a weight of each item, and the like.

Details of "Priority Monitoring Processing"

Figure 9:
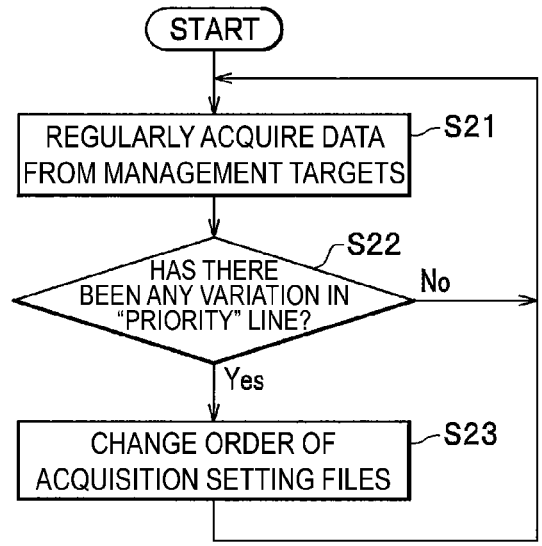
FIG. 9 is a flowchart illustrating details of Step S13 in FIG. 8.

Details of Step S13 in FIG. 8 are illustrated in FIG. 9. The processing in FIG. 9 will be described below.

The data reception unit 11 of the management system 10 regularly and repeatedly executes the processing in Step S21. In other words, the data reception unit 11 receives data that each of the plurality of business operation apparatuses Gx that are management targets regularly distribute from each of the business operation apparatuses Gx. The data that the data reception unit 11 receives in processing performed once includes data of a plurality of items as the telemetry transmission data D01 illustrated in FIG. 2, for example.

The priority management unit 12a of the management system 10 identifies whether or not there has been a request for changing priority of each data item by monitoring an output from the determination unit 14 and a user input from the administrator terminal 21 in Step S22. In a case in which there has been a request for changing priority, the priority management unit 12a moves on to next Step S23 and changes the order of priority for each item in the acquisition setting file Cf2.

In a case in which there has been a request for changing priority in order of the "CPU usage rate", the "memory usage rate", and the "system log" regardless of the weight of each item in the state of the details in the acquisition setting file Cf2 illustrated in FIG. 4, for example, the priority management unit 12a changes the alignment order of each item to the "CPU usage rate", the "memory usage rate", and the "system log" as in the acquisition setting file Cf2 illustrated in FIG. 5.

Details of "Load Level Monitoring Processing"

Figure 10:
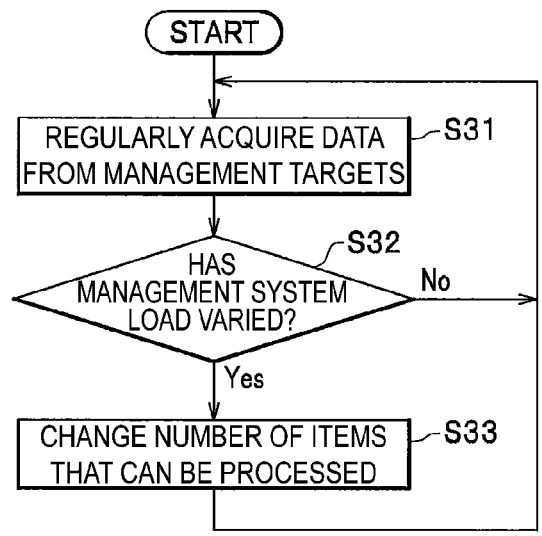
FIG. 10 is a flowchart illustrating details of Step S14 in FIG. 8.

Details of Step S14 in FIG. 8 are illustrated in FIG. 10. The processing in FIG. 10 will be described below.

Similar to Step S21 in FIG. 9, the data reception unit 11 of the management system 10 regularly and repeatedly executes the processing in Step S31 in FIG. 10 and receives data that each of the plurality of business operation apparatuses Gx that are management targets distributes.

The OpS load level management unit 15 of the management system 10 constantly monitors the magnitude and a variation of a load that affects the data processing of the data reception unit 11. The OpS load level management unit 15 then identifies whether or not the load of the data reception unit 11 has steeply changed and whether or not the magnitude of the load has exceeded a threshold value in Step S32, and in a case in which these conditions are satisfied, the processing proceeds to next Step S33.

In Step S33, the OpS load level management unit 15 changes the number of items that can be processed by the data reception unit 11. The number of items that can be processed corresponds to the "total number of items that can be processed" in the load level management table 15a illustrated in FIG. 6 and the limit value for the number of items Nt max in Steps S05 and S06 illustrated in FIG. 7.

In a case in which the load level detected by the OpS load level management unit 15 has changed from "2" to "3", for example, "10" of the "total number of items that can be processed" in the load level "3" is acquired from the load level management table 15a, and the limit value for the number of items Nt max is changed to "10". Through this change, the number of data items on which the data reception unit 11 performs data processing once in Steps S03 to S06 in FIG. 7 is limited to "10".

Details of "Data Acquisition Interval Adjustment"

Figure 11:
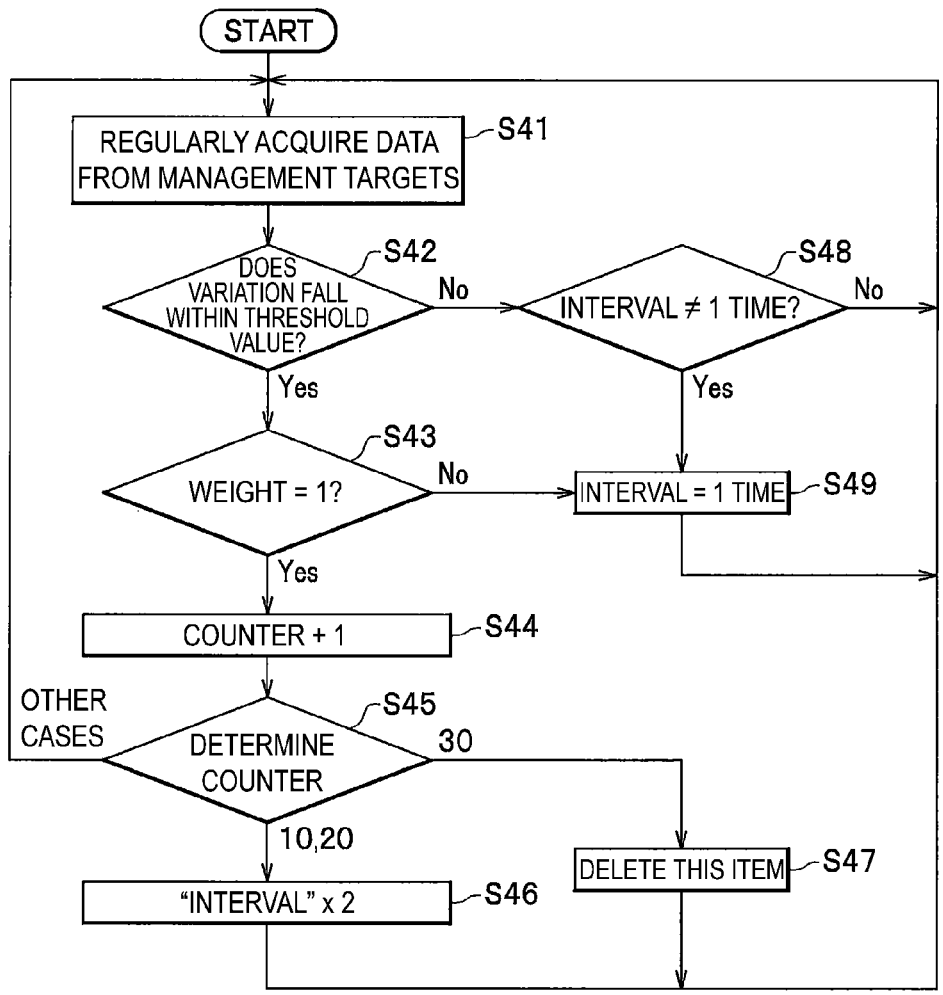
FIG. 11 is a flowchart illustrating details of Step S17 in FIG. 8.

Details of Step S17 in FIG. 8 are illustrated in FIG. 11. The processing in FIG. 11 will be described below.

Similar to Step S21 in FIG. 9, the data reception unit 11 of the management system 10 regularly and repeatedly executes the processing in Step S41 in FIG. 11 and receives data that each of the plurality of business operation apparatuses Gx that are management targets regularly distributes.

The determination unit 14 of the management system 10 determines a trend of a change in data of each item that the data reception unit 11 has received from an output of the data trend measurement unit 13 and identifies whether or not the variation in the value of each item data is within a threshold value in Step S42. The processing proceeds to Step S43 when the variation is within the threshold value, and the processing proceeds to Step S48 when the variation exceeds the threshold value.

The determination unit 14 includes a table for controlling details in the acquisition setting file Cf1 of each business operation apparatus Gx. The table holds a list of a plurality of data items that the business operation apparatus Gx distributes through the telemetry communication path 22, a weight of each data item, and information representing "intervals" of transmission time of each data item.

The determination unit 14 refers to the weight of a corresponding item in the aforementioned table and compares the weight with "1" in Step S43. The processing proceeds to Step S44 in a case in which the weight is equal to "1", and the processing proceeds to Step S49 if the weight is other than "1".

The determination unit 14 manages a counter individually prepared for each data item. The determination unit 14 increments (+1) the value of the counter of the corresponding item in Step S44 and determines the result in Step S45. Then, the processing proceeds to Step S46 in a case in which the value of the corresponding counter is "10" or "20", the processing proceeds to Step S47 in a case in which the value of the corresponding counter is "30", and the processing proceeds to Step S41 if the value of the corresponding counter is another value.

In Step S46, the determination unit 14 changes the "intervals" assigned to the data of the corresponding item in the aforementioned table to double the previous intervals. Note that a value that is one time a standard value is allocated to the "intervals" in an initial state. When the aforementioned counter reaches "10", then the "intervals" are changed to a value that is double the standard value in Step S46. Further, when the aforementioned counter reaches "20", Step S46 is executed again, and the "intervals" are thus changed to a value that is four times the standard value.

When the aforementioned counter reaches "30", the determination unit 14 deletes the corresponding item from the list of data items in the aforementioned table in Step S47. Further, the determination unit 14 clears the value of the counter to "0" at this time.

In Step S48, the determination unit 14 compares the "intervals" of the corresponding item in the aforementioned table with a value that is one time the standard value. The processing proceeds to next Step S49 if the "intervals" are not a value that is one time the standard value, and the processing returns to Step S41 in a case in which the "intervals" coincide with the value that is one time the standard value.

In Step S49, the determination unit 14 resets the "intervals" of the corresponding item in the aforementioned table to one time the standard value.

Details in the aforementioned table that the determination unit 14 manages are reflected in details in the acquisition setting file Cf1 of each business operation apparatus Gx through processing that the data acquisition interval management unit 12b regularly executes, for example. In that case, each business operation apparatus Gx follows the details in the acquisition setting file Cf1, and the data items distributed through the telemetry communication path 22 and the distribution intervals of each item are changed.

In other words, in a case in which the processing illustrated in FIG. 11 is executed, the distribution intervals of a data item with a value that is less varied are changed to double or four times the standard value in Step S46 with elapse of time. However, the distribution intervals of data items with weights other than "1" and data items with increasing variations are returned to one time the standard value in Step S49. If a time during which a variation in value is small increases, the item is deleted in Step S47. The business operation apparatus Gx then excludes the corresponding deleted item from the next distribution targets.

Example of Change in Load Properties

Figure 12A:
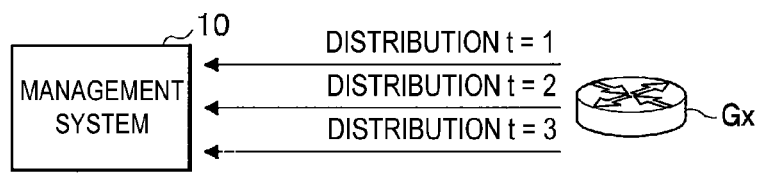
FIG. 12A is a schematic view illustrating an example of data distribution of a management target.
Figure 12B:
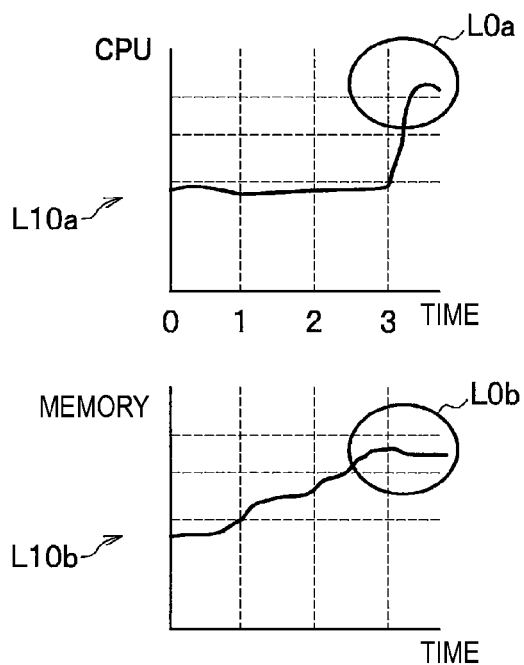
FIG. 12B is a graph illustrating a trend of a change in load condition of the management system.

An example of a relationship between data distribution of the management targets and load properties of the management system is illustrated in FIGS. 12A and 12B.

In the example illustrated in FIG. 12A, a case in which the business operation apparatus Gx distributes data generated inside the business operation apparatus Gx to the management system 10 through telemetry at each of clock times "t=1", "t=2", and "t=3". In the example in FIG. 12A, data that the business operation apparatus Gx distributes includes items of the "CPU usage rate" and the "memory usage rate".

In this case, it is possible to observe a trend of a change in situation as illustrated in FIG. 12B through measurement of the data trend measurement unit 13 in the management system 10. In the example of FIG. 12B, a CPU usage rate L10a and a memory usage rate L10b have increased with elapse of time.

In this case, it is possible to detect each of load increasing states Loa and Lob by comparing absolute values of the CPU usage rate L10a and the memory usage rate L10b or amounts of change in a specific time with predetermined threshold values.

In a case in which the OpS load level management unit 15 has detected the load increasing states Loa and Lob as in FIG. 12B, the processing proceeds from Step S32 to Step S33 illustrated in FIG. 10, for example. As a result, the number of items that can be processed in the acquisition setting file Cf2, that is, the limit value for the number of items Nt max in FIG. 7 decreases. In this manner, the number of data items on which the data reception unit 11 of the management system 10 performs data processing is reduced even in a case in which no change occurs in the data distribution condition of each business operation apparatus Gx, and it is thus possible to reduce the load of the management system 10.

Example of State Transition

Figure 13:
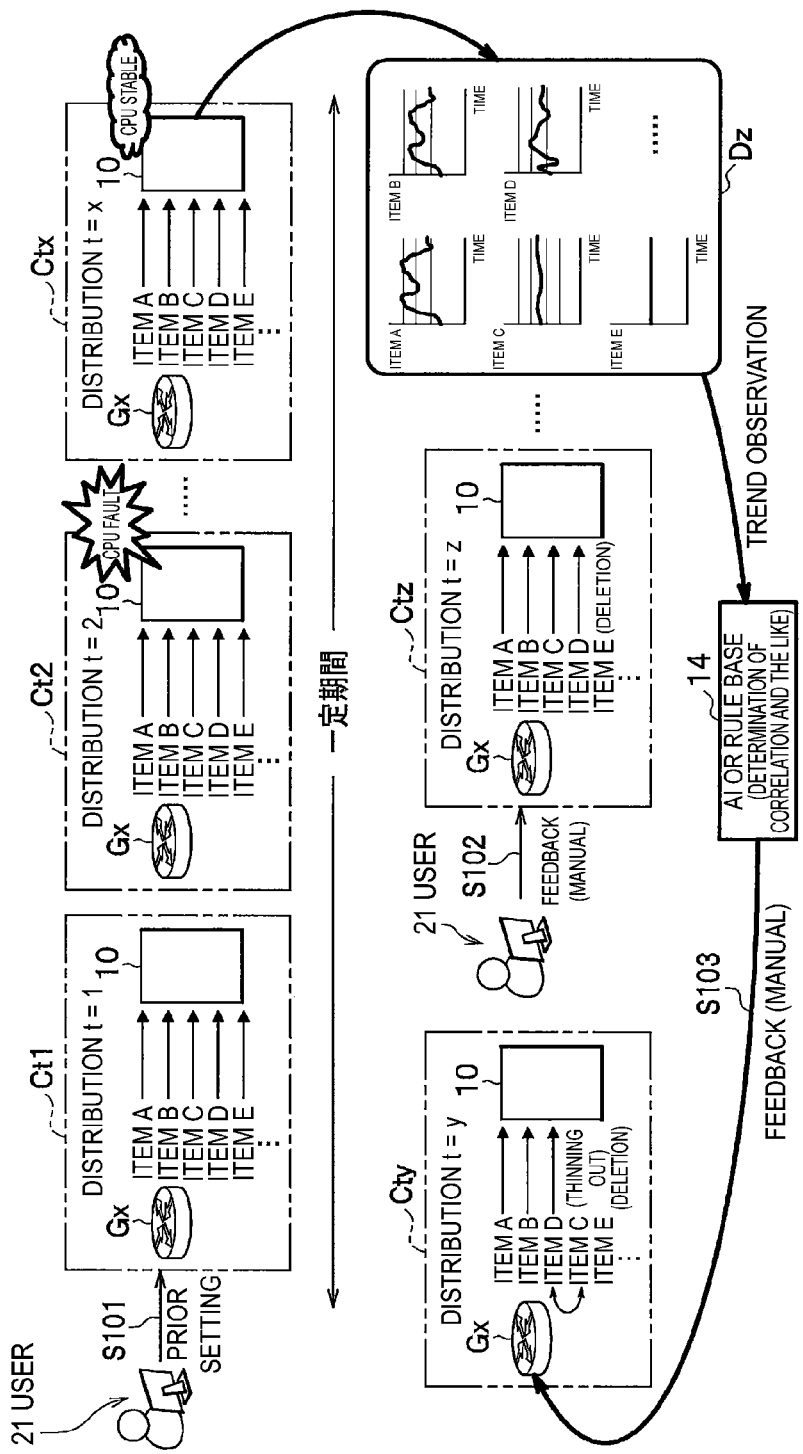
FIG. 13 is a state transition diagram illustrating a relationship between time-dependent changes and a plurality of states in the management targets and the management system.

An example of relationships between time-depending changes and a plurality of states in the management targets and the management system is illustrated in FIG. 13. In FIG. 13, each of states Ct1, Ct2, Ctx, Cty, and Ctz represents data distribution from the business operation apparatus Gx to the management system 10 at each of clock times "t=1", "t=2", "t=X", "t=Y", and "t=Z".

Prior setting is performed in Step S101 in response to a user input from the administrator terminal 21, for example. In this manner, initial states of the acquisition setting files Cf1 and Cf2 are fixed.

The business operation apparatus Gx follows details in the acquisition setting file Cf1 and collectively distributes each piece of data of an "item A", an "item B", an "item C", an "item D", an "item D", . . . in the state Ct1 at the clock time "t=1".

The business operation apparatus Gx also collectively distributes each piece of data of the "item A", the "item B", the "item C", the "item D", the "item E", . . . even in the state Ct2 at the clock time "t=2". However, because the case in which the load of the management system 10 has increased is assumed in the state Ct2, it is possible to reduce the load in accordance with the load level detected by the OpS load level management unit 15.

For example, it is possible to cut down the number of data items per one time that the data reception unit 11 processes the data, based on the "total number of items that can be processed" in the load level management table 15a. The data reception unit 11 thus processes the data of only the "item A" and the "item B" with high priority in the state Ct2 in FIG. 13 and excludes each piece of data of the "item C", the "item D", the "item E", . . . with a low priority from the targets of data processing.

Because the load of the data processing performed by the CPU in the data reception unit 11 decreases in this manner, the state of the CPU is stabilized in the state Ctx with elapse of time. Thus, the load level that the OpS load level management unit 15 detects decreases, and it is possible to increase the "total number of items that can be processed". The data reception unit 11 can thus process all pieces of data of the "item A", the "item B", the "item C", the "item D", and the "item E" in the state Ctx in FIG. 13.

The administrator who operates the administrator terminal 21 can observe an operating condition of the management system 10, perform an input for changing the acquisition setting files Cf1 and Cf2 as needed in Step S102, and manually feed back the current condition. For example, a case in which the operator has performed an operation for deleting the "item E" with a low priority from targets of data processing is assumed in the state Ctz in FIG. 13.

On the other hand, the data trend measurement unit 13 of the management system 10 can monitor chronological changes in data and generate observation data Dz for each of the "item A", the "item B", the "item C", the "item D", the "item E", . . . that the management system 10 has received. The determination unit 14 can observe a trend of each item from details of the observation data Dz that the data trend measurement unit 13 has generated, apply processing using an artificial intelligence or a rule base, and thus perform automatic feedback control in Step S103.

Note that as the observation data Dz that the determination unit 14 observes, using various information such as a power source voltage of the CPU or a temperature of the CPU in the management system 10 in addition to traffic information of data that the business operation apparatus Gx distributes is assumed.

In a case in which the determination unit 14 employs an artificial intelligence, the determination unit 14 estimates a probability of a failure that will occur in the future while learning relationships between failure patterns recognized in the past and the observation data Dz and the like and feeds back the result thereof. In a case in which the determination unit 14 employs a rule base, the determination unit 14 determines a trend of the observation data Dz based on a rule defining correlations among a plurality of data items that are known by the current findings and correlations between each data item and various failure factors, and feeds back the result thereof. For example, there is a large correlation between a temperature rise and the CPU usage rate in the management system 10, and further, there is also a correlation between the CPU usage rate and an apparatus failure. Such relationships are defined by a rule base or the like.

A case in which the priority of the "item D" has become higher than the "item C" in the acquisition setting file Cf2 in the state Cty in FIG. 13 as a result of the feedback control in Step S103 is assumed. As a result, the "item C" with a low priority is thinned out due to influences of the aforementioned limit value for the number of items Nt max.

Additionally, there is substantially no need to monitor items with values that do not substantially change for a long period of time as the "item E" in the observation data Dz illustrated in FIG. 13 and items with low correlations to the "CPU usage rate" that is highly related to an apparatus failure. Details in the acquisition setting file Cf1 are thus changed such that these data items are deleted from the distribution targets of the business operation apparatus Gx in accordance with determination made by the determination unit 14. Alternatively, reflection is made in details in the acquisition setting file Cf2 such that the data reception unit 11 thins out data items with substantially no necessity to be monitored.

Similarly to the processing illustrated in FIG. 11, reflection is made in details in the acquisition setting file Cf1 such that the items with values that do not substantially changes for a long period as the "item E" in the observation data Dz and items with low correlations to the "CPU usage rate" that is highly related to an apparatus failure are thinned out by increasing the time interval at which the business operation apparatus Gx performs distribution to double the ordinary time intervals. Note that for the data items dropping due to the thinning out, values estimated using approximate curves from trends of changes therein are complemented.

Note that patterns of acquisition intervals, priority, and the like of each data item made appropriate for each apparatus type of the business operation apparatus Gx using an artificial intelligence or a rule base of the determination unit 14, for example, may be detected and held, and the patterns may be displayed as details of recommendation on a screen of the administrator terminal 21. In this manner, it is possible to assist a user input in Step S102.

Note that in the data processing illustrated in FIG. 7, a case in which each of data items is selected and processed in order from the highest priority when the data that the data reception unit 11 has received is processed in Step S03 is assumed. However, in a case in which item data is input in a state in which the item data is aligned in advance in order from the highest priority, it is only necessary to simply process the amount of data corresponding to the number of items that coincides with the limit value for the number of items Nt max. In a case in which details of the priority of each item are reflected in the acquisition setting file Cf1, for example, each business operation apparatus Gx can sequentially distribute each data item in a state in which the data items are aligned in order from the highest priority. In that case, the data reception unit 11 can follow the order of the reception in Step S03 in FIG. 7 and process each data item in the order with no change.

Figure 14:
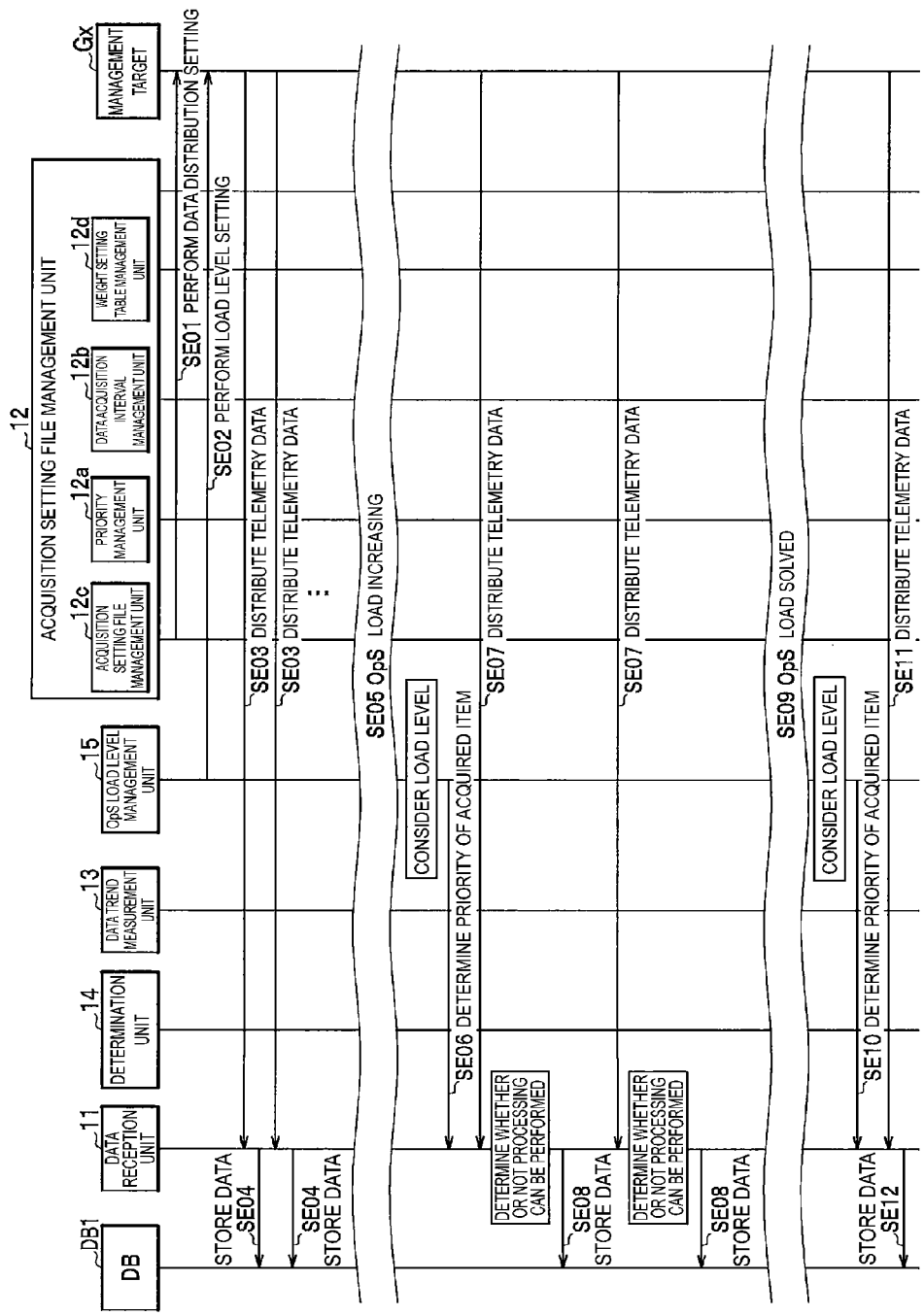
FIG. 14 is a sequence diagram illustrating an operation example in a case in which data acquisition items are controlled in accordance with a load of the management system.

Operation Example in Case in Which Data Acquisition Items are Controlled in Accordance with Load An operation example in a case in which the management system 10 controls data acquisition items in accordance with a load is illustrated in FIG. 14. The operation sequence illustrated in FIG. 14 will be described below.

The acquisition setting unit 12c of the management system 10 performs data distribution setting for the business operation apparatus Gx that is a monitoring target in Procedure SE 01. The result is reflected in details in the acquisition setting file Cf1 illustrated in FIG. 3.

The OpS load level management unit 15 of the management system 10 sets a load level at a regular time in the management system 10 in the business operation apparatus Gx in Procedure SE02. Details thereof are reflected in details in the acquisition setting file Cf1. As a result, a distribution cycle at the time of regular time when the business operation apparatus Gx performs data distribution through the telemetry communication path 22, that is, when data is distributed in Procedure SE03 is determined. In other words, the business operation apparatus Gx regularly executes data distribution.

The data reception unit 11 of the management system 10 receives data provided from the business operation apparatus Gx through the data distribution, processes the data for each item, and registers the result thereof in the telemetry database DB1 in Procedure SE04.

On the other hand, if the load required by the data reception unit 11 to process data has increased as compared with the regular time in Procedure SE05, then the OpS load level management unit 15 performs acquisition item priority determination in Procedure SE06 in consideration of the load level that has changed. In other words, because the "total number of items that can be processed" in the load level management table 15a illustrated in FIG. 6 is limited in accordance with the load level, the limit value for the number of items Nt max in FIG. 7 decreases.

As a result, when the data reception unit 11 performs data processing in Procedure SE08 on the data distributed to the management system 10 in Procedure SE07, only items with high priority are processed, and data of remaining items with a low priority is thinned out, in accordance with details in the acquisition setting file Cf2 and the limit value for the number of items Nt max.

On the other hand, if a condition that the load of the management system 10 is high is solved in Procedure SE09, then the OpS load level management unit 15 performs the acquisition item priority determination again in Procedure SE10 in consideration of the latest load level. In other words, because the limit of the "total number of items that can be processed" in the load level management table 15a is alleviate with a decrease in load level, the limit value for the number of items Nt max in FIG. 7 increases. As a result, when the data reception unit 11 performs data processing on data, which is distributed in Procedure SE11, in Procedure SE12, data of items with relatively low priority are also processing targets, and more data items are registered in the telemetry database DB1.

Figure 15:
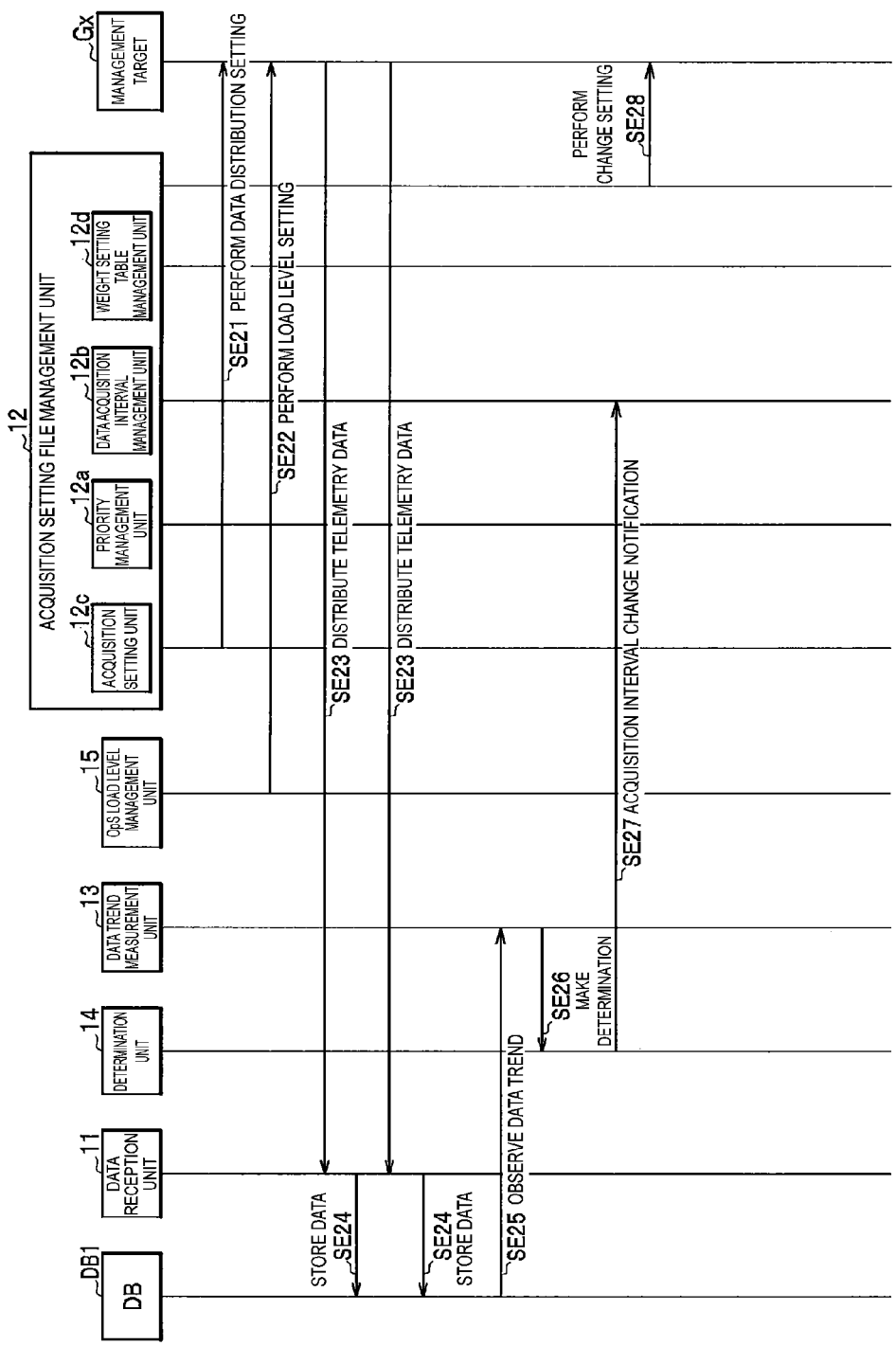
FIG. 15 is a sequence diagram illustrating a first half of an operation example in a case in which data distribution intervals are controlled in accordance with the load of the management system.
Figure 16:
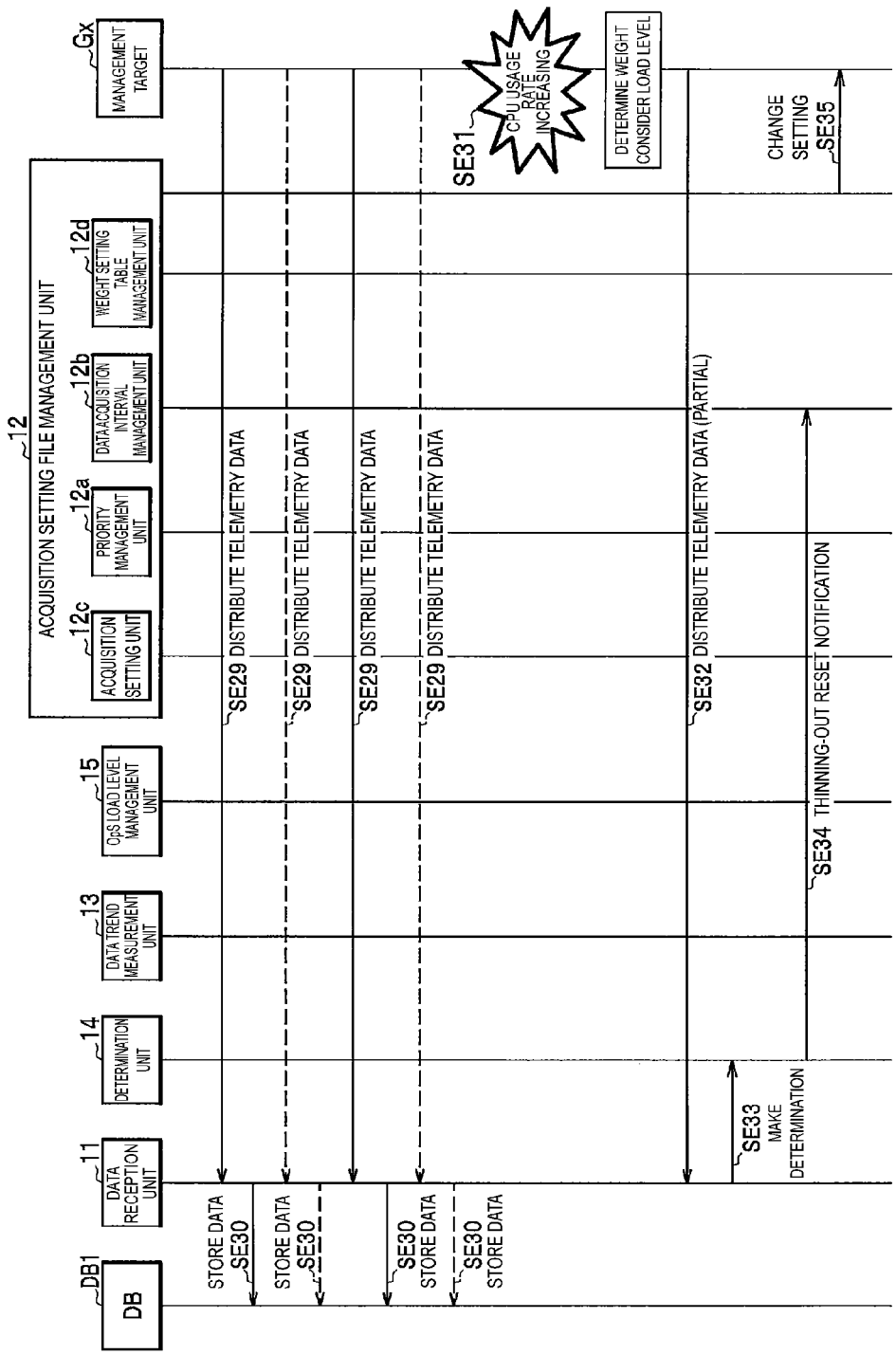
FIG. 16 is a sequence diagram illustrating a second half of the operation example in the case in which the data distribution intervals are controlled in accordance with the load of the management system.

Operation Example in Case in Which Data Distribution Intervals are Controlled in Accordance with Load An operation example in a case in which the management system 10 controls data distribution intervals in accordance with the load thereof is illustrated in FIGS. 15 and 16. The first half and the second half of the operation sequence are illustrated in FIGS. 15 and 16, respectively. The operation sequence illustrated in FIGS. 15 and 16 will be described below. Note that because Procedures SE21 to SE24 illustrated in FIG. 15 are similar to Procedures SE01 to SE04 in FIG. 14, description thereof will be omitted.

In Procedure SE25 in FIG. 15, the data trend measurement unit 13 of the management system 10 observes a trend of data of each item based on details registered in the telemetry database DB1. In Procedure SE26, the determination unit 14 performs determination and executes the processing illustrated in FIG. 11, using the result of the observation performed by the data trend measurement unit 13. In a case in which a data item with a value that does not substantially change for a long period is found, for example, the determination unit 14 thus transmits an acquisition interval change notification to the data acquisition interval management unit 12b in Procedure SE27.

In response to the notification, the acquisition setting file management unit 12 performs change setting for the acquisition setting file Cf1 of the business operation apparatus Gx in Procedure SE28. In this manner, distribution target items when the business operation apparatus Gx distributes data are partially deleted, or intervals of data distribution for each item are changed. The results are reflected in data distribution in Procedure SE29.

The data reception unit 11 of the management system 10 performs data processing on the data of each item, which is distributed in Procedure SE29, in Procedure SE30 and registers the result in the telemetry database DB1. In this case, because the number of items and the reception intervals of the data that the data reception unit 11 receives in Procedure SE29 have been changed, the magnitude of the load when the data reception unit 11 executes the data processing in Procedure SE30 is cut down as compared with the load before Procedure SE28 is executed.

In the example illustrated in FIG. 16, in a case in which the business operation apparatus Gx detects that the CPU usage rate in the business operation apparatus Gx itself has increased in Procedure SE31, the business operation apparatus Gx itself performs special control. In other words, data items to be distributed in Procedure SE32 are cut down in consideration of the weight of each item and the load level for each of items that are defined as distribution targets in the acquisition setting file Cf1. For example, only data of partial items with relatively large weights is distributed in Procedure SE32.

In this case, the determination unit 14 monitors and determines items, which the data reception unit 11 has received in Procedure SE 32, in Procedure SE33 and transmits a thinning reset notification to the data acquisition interval management unit 12b in Procedure SE34. In response to the notification, the acquisition setting file management unit 12 sets the acquisition setting file Cf1 so as to change the intervals of data distribution of each item in Procedure SE35.

Advantages of maintenance management system and data processing method In the management system 10 illustrated in FIG. 3, it is possible to execute the processing in FIG. 7 based on details in the acquisition setting file Cf2 and to process only the data items with high priority in a narrowed down manner when the data reception unit 11 performs data processing. It is thus possible to efficiently reduce a load without leading to dropping of important data even in a case in which a large amount of data is distributed from a plurality of business operation apparatuses Gx through the telemetry.

The management system 10 can reflect the weight of each data in accordance with necessity thereof in control and dynamically change data acquisition intervals and priority of processing for each item. It is thus possible to efficiently reduce a load without leading to dropping of important data item even in a case in which operating conditions of the business operation apparatus Gx or the management system 10 have changed.

According to the management system 10, the determination unit 14 can observe a trend of the observation data Dz as in FIG. 13 and provide a feed back to the data processing of the management system 10. It is thus possible to make data items that the management system 10 processes appropriate in response to various changes in conditions.

Because the management system 10 changes intervals at which data of each item is distributed to multiples of a reference cycle through the processing illustrated in FIG. 11, it is possible to curb influences of thinning-out of data on correlations among a plurality of data items.

REFERENCE SIGNS LIST

10 Management system (maintenance management system)
11 Data reception unit (data processing unit)
11a Buffer
12 Acquisition setting file management unit
12a Priority management unit
12b Data acquisition interval management unit
12c Acquisition setting unit
12d Weight setting table management unit
13 Data trend measurement unit
14 Determination unit
15 OpS load level management unit (load level management unit)
15a Load level management table
16 Abnormality detection unit
18 Control communication path
21 Administrator terminal
22, 22a Telemetry communication path
Cf1, Cf2 Acquisition setting file
Cf2a Priority section
Cf2b Item section
Cf2c Weight section
Ct1, Ct2, Ctx, Cty, Ctz State
D0L D02 Telemetry transmission data
Dx Telemetry reception data
Dz Observation data
DB1 Telemetry database
Gx, G01, G02, G03, G04, G05, G06, G07 Business operation apparatus
L10a CPU usage rate
L10b Memory usage rate
Loa, Lob Load increasing state
NW Communication network
Nt Number of data items
Nt max Limit value for number of items

The invention claimed is:

1. A maintenance management system for managing a plurality of business operation apparatuses, each of which has a function of regularly distributing data using telemetry techniques, the maintenance management system comprising:
a data processing unit, including one or more processors, configured to acquire and process each piece of data that the plurality of business operation apparatuses regularly distribute; and
a load level management unit, including one or more processors, configured to:
cut down the amount of data processing to reduce a load required by the data processing unit to process the data in accordance with a level of the load,
execute, in a case in which a plurality of items are included in the data distributed by each of the plurality of business operation apparatuses, at least one of processing for adjusting the number of data items to be processed by the data processing unit and processing for adjusting time intervals at which each data item is processed,
dynamically adjust, in accordance with a variation in necessity related to each data item, the priority of corresponding data item or time intervals at which each data item is processed, and
raise a priority of a data item in which an abnormal value has occurred or reduce time intervals for processing the data item in which the abnormal value has occurred.

2. The maintenance management system according to claim 1,
wherein the load level management unit is configured to define a priority of each data item, and
the data processing unit is configured to process each data item in order from the highest priority and end the processing at a timing at which the number of processed data items reaches an upper limit.

3. The maintenance management system according to claim 1, wherein the load level management unit is configured to provide feedback to make data items that are processing targets of the data processing unit appropriate, based on a trend of data in each data item.

4. The maintenance management system according to claim 3, wherein the load level management unit is configured to exclude, from the processing targets, data items with low correlations to a predetermined data item that is highly related to a failure in the business operation apparatus and/or data items that do not change for a specific period.

5. The maintenance management system according to claim 3, wherein the load level management unit is configured to thin out processing of the data items by doubling time intervals for processing data items with low correlations to a predetermined data item that is highly related to a failure in the business operation apparatus and/or data items that do not change for a specific period.

6. A data processing method for controlling a maintenance management system that manages a plurality of business operation apparatuses, each of which has a function of regularly distributing data using telemetry techniques, the data processing method comprising:
acquiring and processing each piece of data that the plurality of business operation apparatuses regularly distribute;

monitoring a level of a load required by the maintenance management system to process the data;

in a case in which a plurality of items are included in each piece of the data that the plurality of business operation apparatuses distribute, executing at least one of processing for adjusting the number of data items to be processed and processing for adjusting time intervals at which each data item is processed;

cutting down the amount of data processing in accordance with the level of the load;

providing feedback to make data items that are processing targets of the data processing unit appropriate, based on a trend of data in each data item; and excluding, from the processing targets, data items with low correlations to a predetermined data item that is highly related to a failure in the business operation apparatus and/or data items that do not change for a specific period.

7. The data processing method according to claim 6, further comprising:

defining a priority of each data item; and processing each data item in order from the highest priority and ending the processing at a timing at which the number of processed data items reaches an upper limit.

8. The data processing method according to claim 6, further comprising:

dynamically adjusting, in accordance with a variation in necessity related to each data item, the priority of corresponding data item or time intervals at which each data item is processed.

9. The data processing method according to claim 8, further comprising:

raising a priority of a data item in which an abnormal value has occurred or reducing time intervals for processing the data item in which the abnormal value has occurred.

10. The data processing method according to claim 6, further comprising: thinning out processing of the data items by doubling time intervals for processing data items with low correlations to a predetermined data item that is highly related to a failure in the business operation apparatus and/or data items that do not change for a specific period.

11. A maintenance management system for managing a plurality of business operation apparatuses, each of which has a function of regularly distributing data using telemetry techniques, the maintenance management system comprising:

a data processing unit, including one or more processors, configured to acquire and process each piece of data that the plurality of business operation apparatuses regularly distribute; and a load level management unit, including one or more processors, configured to:

cut down the amount of data processing to reduce a load required by the data processing unit to process the data in accordance with a level of the load, execute, in a case in which a plurality of items are included in the data distributed by each of the plurality of business operation apparatuses, at least one of processing for adjusting the number of data items to be processed by the data processing unit and processing for adjusting time intervals at which each data item is processed, provide feedback to make data items that are processing targets of the data processing unit appropriate, based on a trend of data in each data item, and thin out processing of the data items by doubling time intervals for processing data items with low correlations to a predetermined data item that is highly related to a failure in the business operation apparatus and/or data items that do not change for a specific period.

\* \* \* \* \*